(12) United States Patent
Wang et al.

(10) Patent No.: US 8,204,114 B2
(45) Date of Patent: Jun. 19, 2012

(54) DIRECTION DETECTION ALGORITHMS FOR H.264/AVC INTRA PREDICTION

(75) Inventors: Jhing-Fa Wang, TaiNan (TW); Wei-Guang Lin, TaiNan (TW); An-Chao Tsai, TaiNan (TW)

(73) Assignee: National Cheng-Kung University, TaiNan (TW)

( * ) Notice: Subject to any disclaimer, the term of this patent is extended or adjusted under 35 U.S.C. 154(b) by 1020 days.

(21) Appl. No.: 12/167,653

(22) Filed: Jul. 3, 2008

(65) Prior Publication Data

US 2009/0052534 A1 Feb. 26, 2009

(30) Foreign Application Priority Data

Aug. 22, 2007 (TW) .............................. 96131135 A (51) Int. Cl.
*H04B 1/66* (2006.01)
(52) U.S. Cl. ................................. 375/240.12
(58) Field of Classification Search ............. 375/240.12, 375/240.13
See application file for complete search history.

(56) References Cited

U.S. PATENT DOCUMENTS

| | | | |
|---|---|---|---|
| 7,369,707 B2 * | 5/2008 | Sakaguchi et al. | 382/239 |
| 7,706,442 B2 * | 4/2010 | Kuo | 375/240.12 |
| 7,933,334 B2 * | 4/2011 | Kanehara | 375/240.16 |
| 8,000,390 B2 * | 8/2011 | Zhao et al. | 375/240.13 |
| 2006/0182174 A1 | 8/2006 | Kuo | |
| 2007/0036215 A1 * | 2/2007 | Pan et al. | 375/240.12 |
| 2007/0133891 A1 * | 6/2007 | Jeong | 382/238 |
| 2008/0152004 A1 * | 6/2008 | Fujisawa et al. | 375/240.12 |
| 2009/0034856 A1 * | 2/2009 | Moriya et al. | 382/238 |

OTHER PUBLICATIONS

Wiegand et al.; Overview of the H.264/AVC Video Coding Standard; IEEE Transaction on Circuits and Systems for Video Technology; Jul. 2003; vol. 13, No. 7, pp. 560-576.
Huang et al.; Analysis, Fast Algorithm, and VLSI Architecture Design for H.264/AVC Intra Frame Coder; IEEE Transaction on Circuits and Systems Video Technology; Mar. 2003; vol. 15, No. 3, pp. 387-401.
Pan et al., Fast Mode Decision Algorithm for Intra Prediction in H.264/AVC Video Coding; IEEE Transaction on Circuits and Systems for Video Technology; Jul. 2005; vol. 15, No. 7; pp. 813-822.
Wang et al.; A Novel Fast Algorithm for Intra Mode Decision in H.264/AVC Encoders; IEEE ISCAS; May 2006; pp. 3498-3501.
Tseng et al.; Enhanced Intra-4x4 Mode Decision for H.264/AVC Coders; IEEE Transaction on Circuits and System for Video Technology; Aug. 2006; vol. 16, No. 8, pp. 1027-1032.

* cited by examiner

*Primary Examiner* — Ricky Ngo
*Assistant Examiner* — Ben H Liu
(74) *Attorney, Agent, or Firm* — Rabin & Berdo, P.C.

(57) ABSTRACT

A block intra prediction direction detection algorithm comprises acts of dividing a block, finding directions from edge assent rules, determining a main edge of the block, selecting prediction modes from the main edge, choosing base prediction modes and using all unique selected and base prediction modes in intra prediction. The algorithms comprise a 4×4 block intra prediction direction detection algorithm, a 16×16 luminance block intra prediction direction detection algorithm and an 8×8 chrominance block intra prediction direction detection algorithm.

17 Claims, 7 Drawing Sheets

DIRECTION DETECTION ALGORITHMS FOR H.264/AVC INTRA PREDICTION

FIELD OF THE INVENTION

The present invention relates to algorithms for video coding, and more particularly, to direction detection algorithms for H.264/AVC intra prediction.

DESCRIPTION OF THE RELATED ART

A conventional H.264/AVC is a standard for video compression, performs coding efficiency better than MPEG-2 and MPEG-4 and achieves minimum rate-distortion and quality video display.

Some detailed information about intra prediction in H.264/AVC is available in "Overview of the H.264/AVC," IEEE Transaction on Circuits and Systems, Video Technology, volume. (vol.) 13, pages (pp.) 560-576, by T. Wiegand, G. J. Sullivan, G Bjontegaard and A. Luthra, July 2003.

Many articles have proposed mode selecting prediction methods to accelerate encoding speed to IEEE Transaction on Circuits and Systems Video Technology, such as Y. W. Huang, B. Y. Hsieh, T. C. Chen and L. G. Chen in vol. 15, no. 3, pp. 387-401 entitled "Analysis, fast algorithm, and VLSI architecture design for H.264/AVC intra frame coder" in March 2003, that addressed a context-based execution algorithm that adaptively skips unlikely prediction modes and simplifies matching operations, thereby saving as much as 50% of the encoding time. In July 2005, F. Pan, X. Lin, S. Rahardja, K. P. Lim, Z. G. Li, D. Wu and S. Wu proposed a "Fast mode decision algorithm for intra prediction in H.264/AVC video coding" by using a Sobel operator as a solution to an intra mode detection scheme that measures the edge angle of an original block and macroblock (MB) to reduce the number of probable modes thereby reducing overall complexity. The Sobel operator indicated 3×3 pixels within a digital image in which $Z_5$ is a center point surrounded with eight points pointing in various directions. The Sobel operator equation is $$\nabla f \approx |(Z7+2Z8+Z9)-(Z1+2Z2+Z3)|+|(Z3+2Z6+Z9)-(Z1+2Z4+Z7)|$$

that gets a gradient in a digital image and is often applied to industrial inspecting, not only to help people to detect defects but also for pre-inspecting in automation techniques.

Furthermore, J. F. Wang, J. C. Wang, J. T. Chen, A. C. Tsai and A. Paul in May 2006 presented "A Novel Fast Algorithm for Intra Mode Decision in H.264/AVC Encoders" at Proceeding IEEE International Symposium Circuit System proposed a simple detection algorithm and used it as feature descriptors in MPEG-7, which achieves a better result than the previously available algorithms.

In August 2006, C. H. Tseng, H. M. Wang and J. F. Yang proposed "Enhanced Intra-4×4 mode decision for H.264/AVC encoders" in IEEE Transaction on Circuits and System Video Technology, vol. 16, no. 8, pp. 1027-1032 that disclosed that H.264/AVC employed a rate-distortion optimization (RDO) technique to minimize rate-distortion (RD) cost, which was based on the distortion model using the Lagrangian coefficient. However, the computational complexity of the H.264/AVC encoder is dramatically increased by the RDO technique since the H.264/AVC encoder has to encode the target block by searching all possible modes exhaustively for the best mode in the intra frame coding process.

Additionally, published US patent application no. 20060182174, "method for coding mode selection of intra prediction in video compression," disclosed a method and an apparatus used for coding mode selection of intra prediction in video compression. The method uses an alternative full search coding algorithm to reduce frequency of searching all possible modes. Thus, the proposed method does not require a full predictor to get a summation of the target coding blocks. Rather it compares the estimated sums of all modes with a low boundary threshold, and the undesired modes are quickly eliminated, which decreases the number of predictor calculations and cost evaluations that require intensive computations.

However, the foregoing method adapts candidates of modes to estimate roughly the matching error of the target coding blocks. Therefore, implementing an ideal intra prediction can still be tedious and difficult. In other words, these techniques cannot achieve the maximum compression ratio.

The H.264/AVC conducted in the transform domain intra prediction in a spatial domain, which is adopted a 4×4 block intra prediction and a 16×16 block intra prediction. For example, the 4×4 block intra prediction is based on predicting each 4×4 block separately and extracting a predictor from the 4×4 block and passing any residual to the transform processes. With reference to FIG. 1(a) to FIG. 1(i), the 4×4 block intra prediction identifies one of 9 possible encoding modes (mode 0 to mode 8):

Mode 0: (FIG. 1(a)) a vertical mode;
Mode 1: (FIG. 1(b)) a horizontal mode;
Mode 2: (FIG. 1(c)) a DC mode;
Mode 3: (FIG. 1(d)) a diagonal down/left mode;
Mode 4: (FIG. 1(e)) a diagonal down/right mode;
Mode 5: (FIG. 1(f)) a diagonal right mode;
Mode 6: (FIG. 1(g)) a horizontal down mode;
Mode 7: (FIG. 1(h)) a diagonal left mode, and
Mode 8: (FIG. 1(i)) a horizontal up mode.

Moreover, the 16×16 block intra prediction only identifies one of 4 possible encoding modes (mode 0 to mode 3) due to its characteristic for coding smooth regions of an image:

Mode 0: (FIG. 1(a)) a vertical mode;
Mode 1: (FIG. 1(b)) a horizontal mode;
Mode 2: (FIG. 1(c)) a DC mode;
Mode 3: a Plane mode (not shown).

Since coding mode calculations for intra prediction are a great burden to the encoder, the encoder of H.264/AVC must perform mass calculations to determine accurate predictions. Generally, the 4×4 block intra prediction require total 9 times more calculations to get the best result.

Currently, video signal distribution and digital storage are popular. To reduce the bandwidth used by video signal transmission, a known method to encode digital video efficiently for video compression is used to lower the bit rate of digital video code.

The techniques of internet transmission continue to progress rapidly with more and more videos being sent and used, and people normally demanding fast transmission and smooth quality. The balance between compression quality and data compression ratio must be considered to assure that the video can be watched with acceptable distortion while retaining high speed transmission. Through proper arrangement and combination for coding modes, this requires massive calculations. Thus, the massive coding mode calculations for processing intra prediction still remain a great burden.

Because the foregoing problems exist in all techniques, an efficient method for coding mode selection of intra prediction needed to be developed to reduce the encoding time in H.264/AVC.

The H.264/AVC encoding processes were obtained from employment of improved intra and inter prediction, variable block motion estimation and multiple reference frames. The RDO technique for the optimum intra frame coding mode selection was proposed to achieve minimum rate distortion.

SUMMARY OF THE INVENTION

The primary objective of the present invention is to reduce the complexity of mode selection and number of coding mode calculations in an H.264/AVC intra prediction.

A block intra prediction direction detection algorithm comprises acts of dividing a block, finding directions from edge assent rules, determining a main edge of the block, selecting prediction modes from the main edge, choosing base prediction modes and using all unique selected and base prediction modes in intra prediction. The algorithms comprise a 4×4 block intra prediction direction detection algorithm, a 16×16 luminance block intra prediction direction detection algorithm and an 8×8 chrominance block intra prediction direction detection algorithm.

BRIEF DESCRIPTIONS OF THE DRAWINGS

The features and many of the attendant advantages of the direction detection algorithm for H.264/AVC intra prediction in accordance with the present invention will become more apparent by reference to the following detailed description, when taken in conjunction with the accompanying drawings.

FIG. 1 (a) is a graph of a vertical encoding mode (mode 0);

FIG. 1 (b) is a graph of a horizontal encoding mode (mode 1);

FIG. 1 (c) is a graph of a DC encoding mode (mode 2);

FIG. 1 (d) is a graph of a diagonal down/left encoding mode (mode 3);

FIG. 1 (e) is a graph of a diagonal down/right encoding mode (mode 4);

FIG. 1 (f) is a graph of a diagonal right encoding mode (mode 5);

FIG. 1 (g) is a graph of a horizontal down encoding mode (mode 6);

FIG. 1 (h) is a graph of a diagonal left encoding mode (mode 7);

FIG. 1 (i) is a graph of a horizontal up encoding mode (mode 8).

FIG. 3 (a) is a drawing of the horizontal direction of 4 major directions used in determining based on the average pixels value in the specified directions to determine a main edge.

FIG. 3 (b) is a drawing of the vertical direction of 4 major directions used in determining based on the average pixels value in the specified directions to determine a main edge.

FIG. 3 (c) is a drawing of diagonal down-left direction of 4 major directions used in determining based on the average pixels value in the specified directions to determine a main edge.

FIG. 3 (d) is a drawing of diagonal down-right direction of 4 major directions used in determining based on the average pixels value in the specified directions to determine a main edge.

DETAILED DESCRIPTION OF THE PRESENT INVENTION

Direction detection algorithms in accordance with the present invention for H.264/AVC intra prediction decrease calculation complexity, effectively estimate direction inside a block to narrow prediction modes, reduce rate distortion optimization (RDO) calculations, maintain the appreciable quality of images and comprise a 4×4 block intra prediction direction detection algorithm, a 16×16 luminance (luma) block intra prediction direction detection algorithm and an 8×8 chrominance (chroma) block intra prediction direction detection algorithm.

Figure 5:
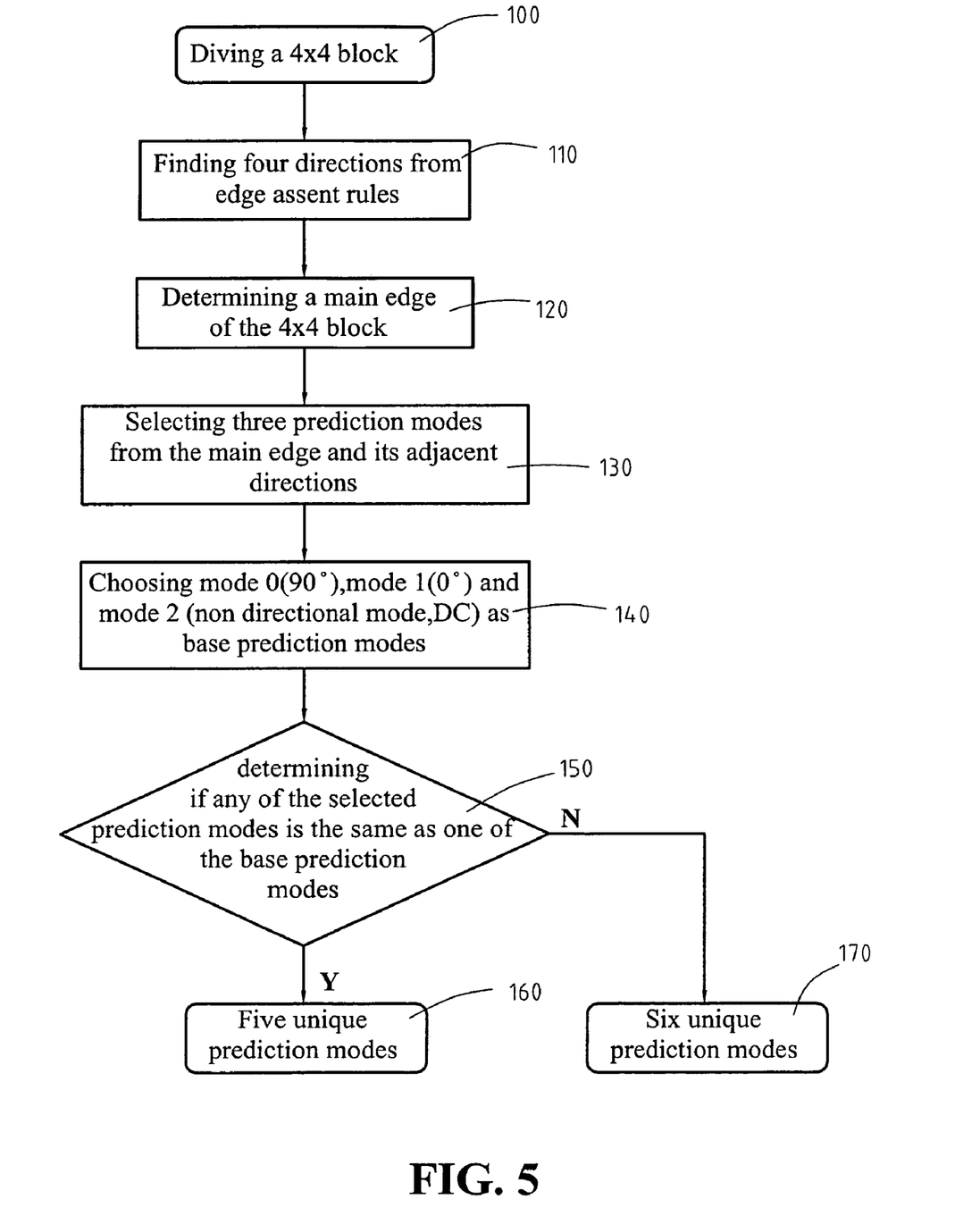
FIG. 5 is a logic diagram of a 4×4 block intra prediction direction detection algorithm in accordance with the present invention.

With reference to FIG. 5, the 4×4 block intra prediction direction detection algorithm comprises acts of dividing a 4×4 block (100), finding four directions from edge assent rules (110), determining a main edge of the 4×4 block (120), selecting three prediction modes from the main edge and its adjacent directions (130), choosing mode 0 (90°), mode 1 (0°) and mode 2 (non directional mode, DC) as base prediction modes (140), determining if any of the selected prediction modes (from 130) is the same as one of the base prediction modes (from 140) (150), if so, using the five unique prediction modes (160) and if not, using all six of the prediction modes (170).

Figure 1:
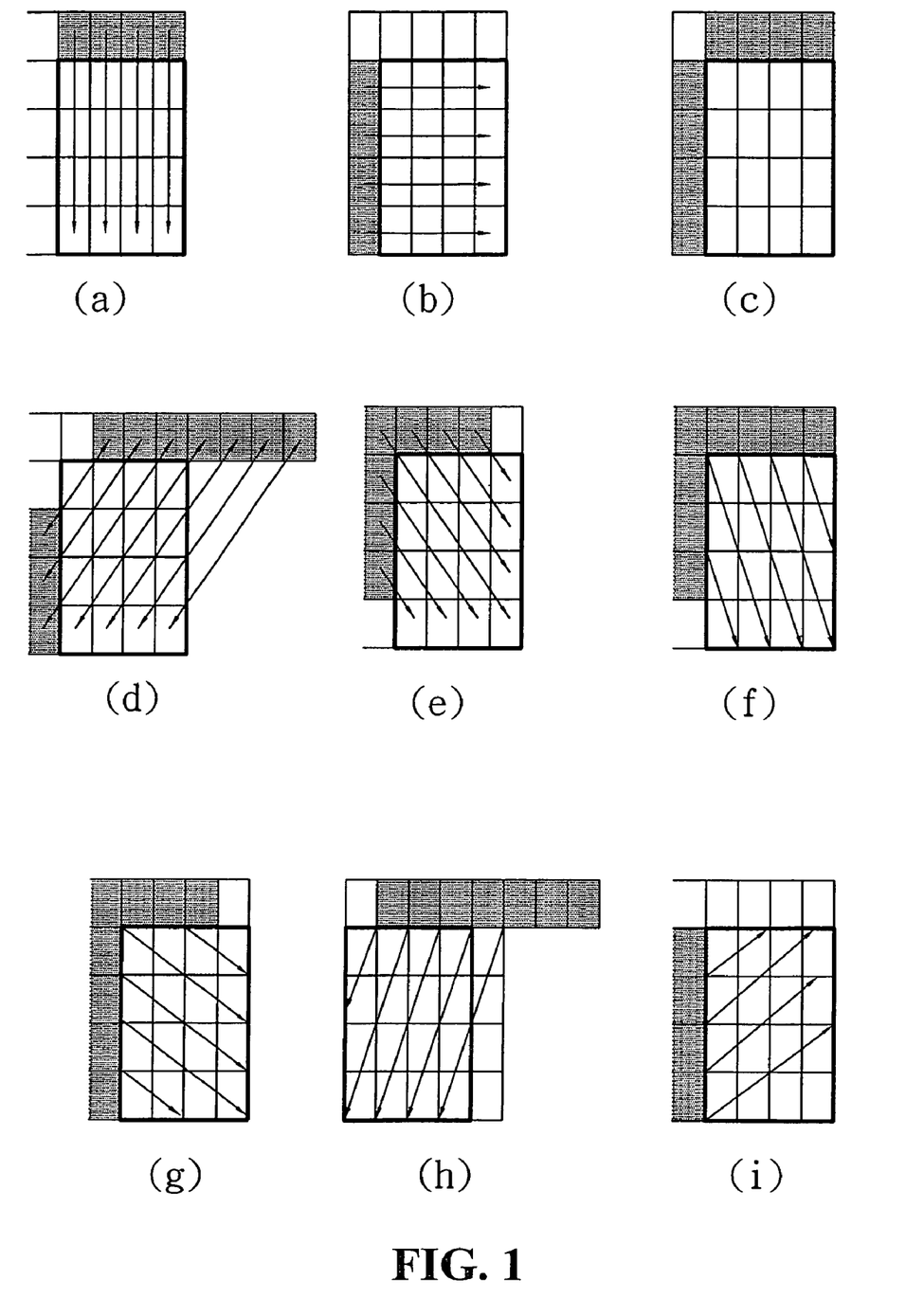
Figure 2:
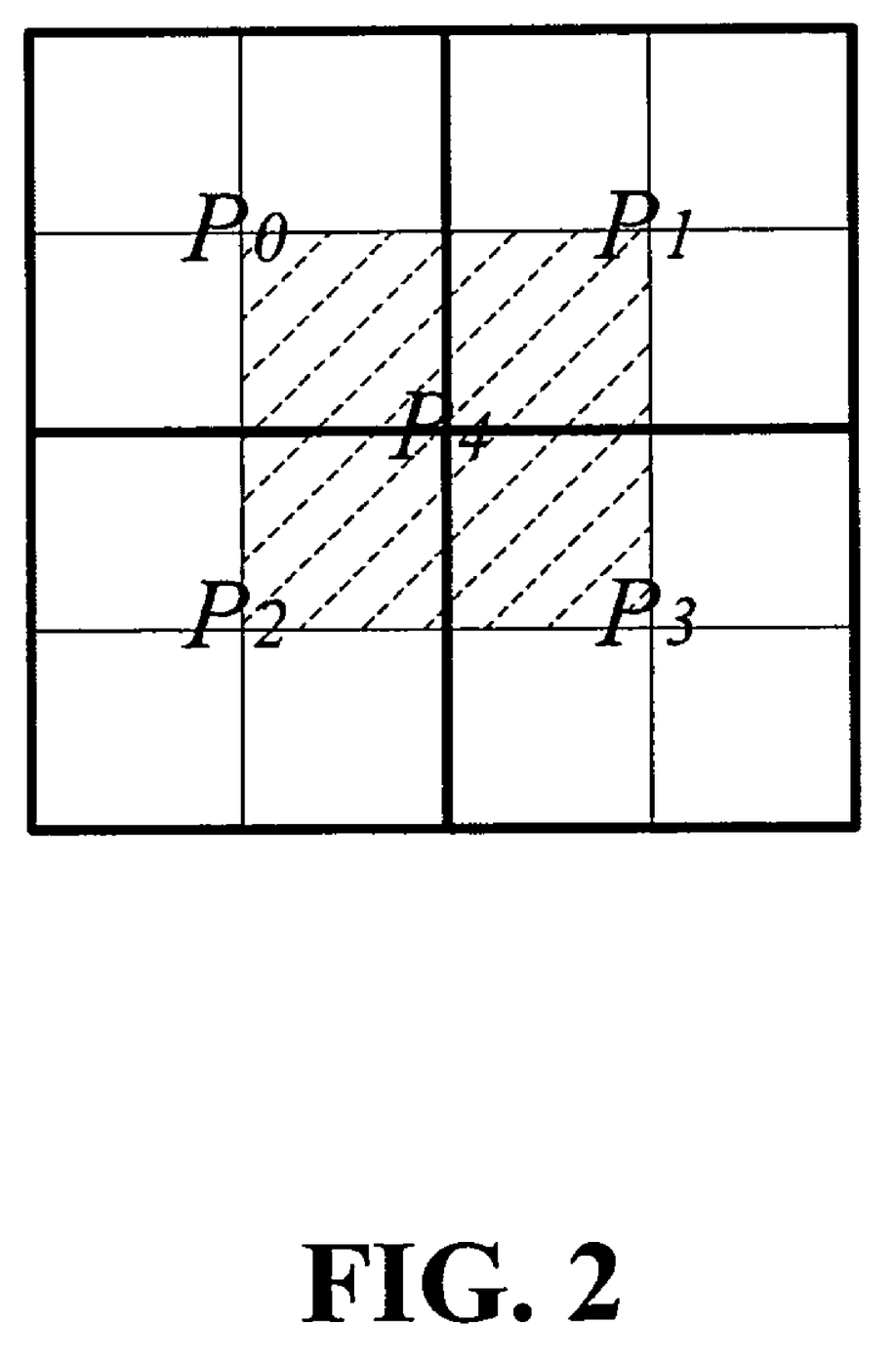
FIG. 2 is a drawing of a 4×4 block with five 2×2 sub-blocks used in executing a 4×4 block intra prediction direction detection algorithm.
Figure 3:
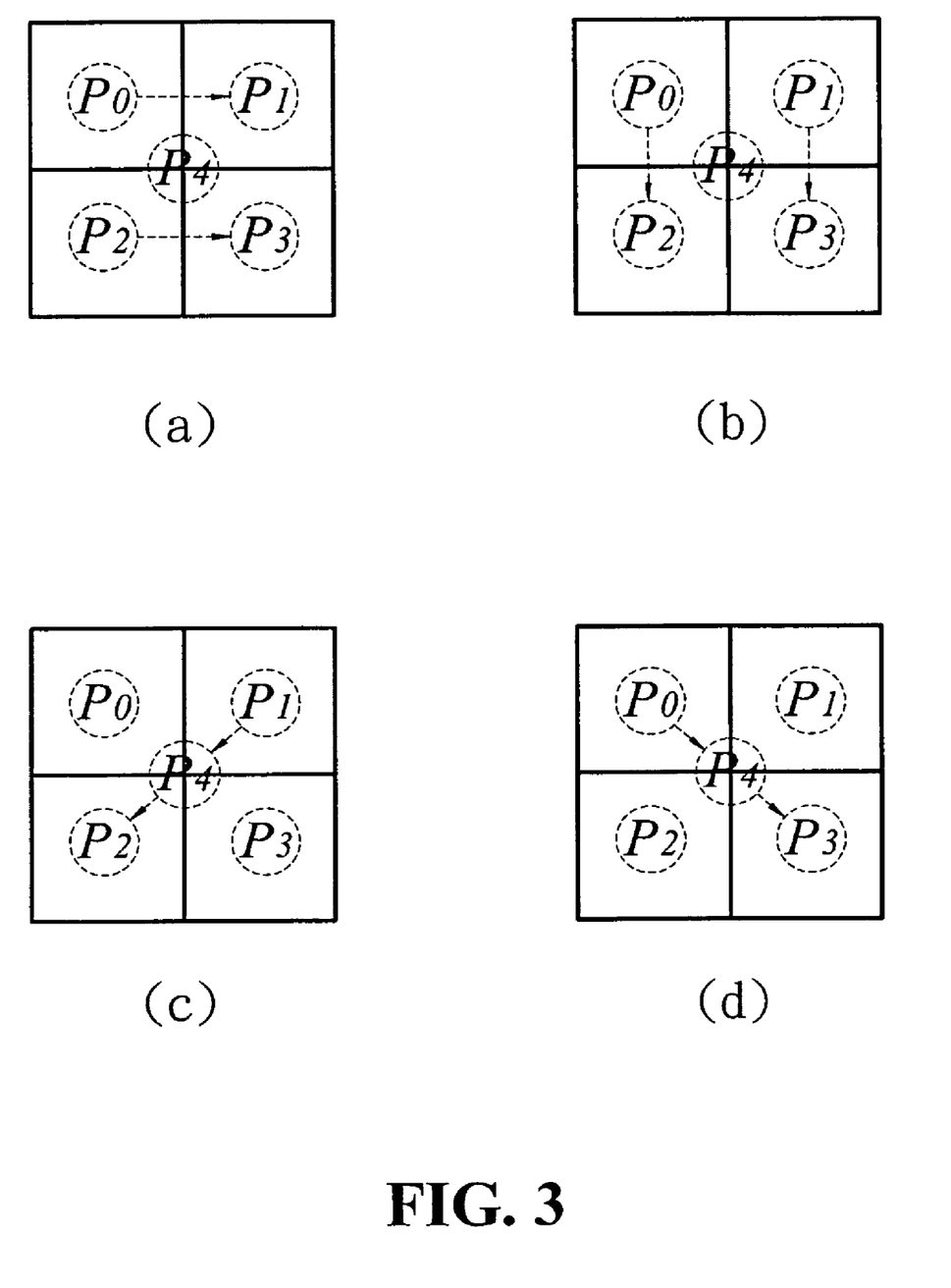

With reference to FIG. 2, the act of dividing a 4×4 block (100) further comprises dividing a 4×4 block into four evenly-divided 2×2 sub-blocks and an inner 2×2 sub-block and computing average pixel values ($P_0$, $P_1$, $P_2$ and $P_3$) for the four evenly-divided 2×2 sub-blocks and an average pixel value ($P_4$) for the inner 2×2 sub-block. The average pixel values ($P_k$) can be attained by $P_k = \{f(x_k, y_k) + f(x_k+1, y_k), f(x_k, y_k+1), f(x_k+1, y_k+1)\}/4$ where k=0, 1, 2, 3, and 4, and ($x_k$, $y_k$) denotes the starting position of a $k^{th}$ 2×2 sub-block, $f(x_k, y_k)$ is a pixel value of the $x_k$, $y_k$ position.

For example, the 4×4 block (100) has luma pixels data as follows:

| | | | |
|---|---|---|---|
| 84 | 84 | 84 | 84 |
| 84 | 84 | 84 | 84 |
| 83 | 83 | 83 | 83 |
| 83 | 83 | 83 | 83 |

The act of finding four directions from edge assent rules (110) is based on a finding that an edge of an image, which highly correlates to a predictive mode in intra prediction and comprises determining an edge assent to the 4×4 block, where the following edge assent rules have been developed:

$$d^{0°} = |P_1 - P_0| + |P_3 - P_2|$$

$$d^{90°} = |P_2 - P_0| + |P_3 - P_1|$$

$$d^{45°} = |P_4 - P_1| + |P_2 - P_4|$$

$$d^{135°} = |P_4 - P_0| + |P_3 - P_4|$$

With reference to FIG. 3(a)-3(d), using the foregoing edge assent rules allows block direction error strengths to be determined based on the average pixels value in the specified directions to determine a main edge of the 4×4 block.

The act of determining a main edge of the 4×4 block (120) is based on a smaller direction error strength indicating a more preferable direction. Therefore, the main edge of the 4×4 block is determined by the smallest direction error strength.

Figure 4:
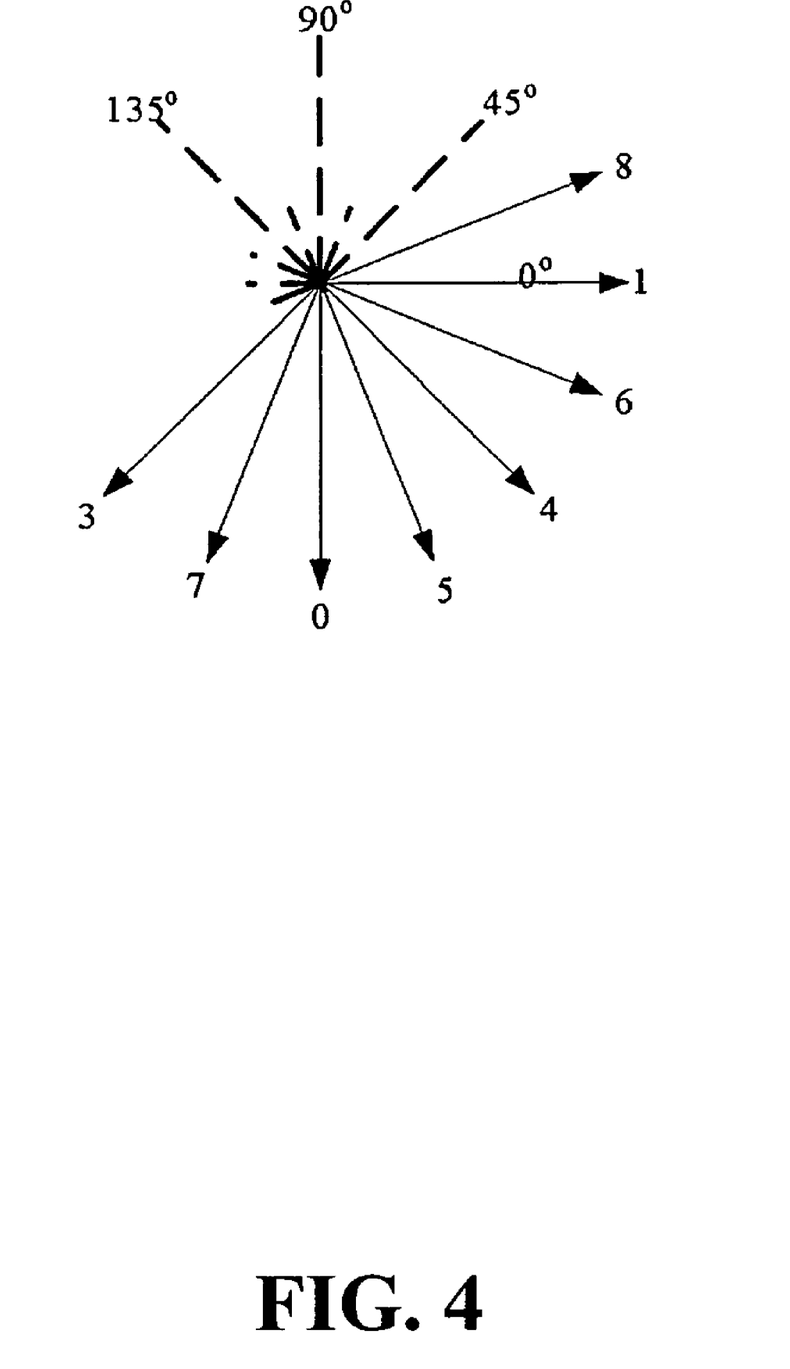
FIG. 4 is a drawing the relationship between directions and prediction modes in intra prediction.

With reference to FIG. 4, the act of selecting three prediction modes from the main edge and its adjacent directions (130) is based on a predetermined arrangement of adjacent directions relative to the main edge.

The act of choosing mode 0 (90°), mode 1 (0°) and mode 2 (non directional mode, DC) as base prediction modes (140) is performed because the inventor has found intra prediction experiments have shown that Mode 0 (90°), Mode 1 (0°) and Mode 2 (non directional mode, DC) are the most frequently selected modes in intra prediction.

The act of determining if any of the selected prediction modes (from 130) is the same as one of the base prediction modes (from 140) (150) is performed by comparing each of the selected prediction modes to the base prediction modes.

Because adjacent directions are significantly less than 45°, the three selected prediction modes will correspond to no more than one of the base prediction modes and only five unique prediction modes exist (160) if one of the three selected prediction modes corresponds to one of the base prediction modes.

If none of the selected prediction modes corresponds to any of the three base prediction modes, six unique prediction modes exist and will be used (170).

Figure 6:
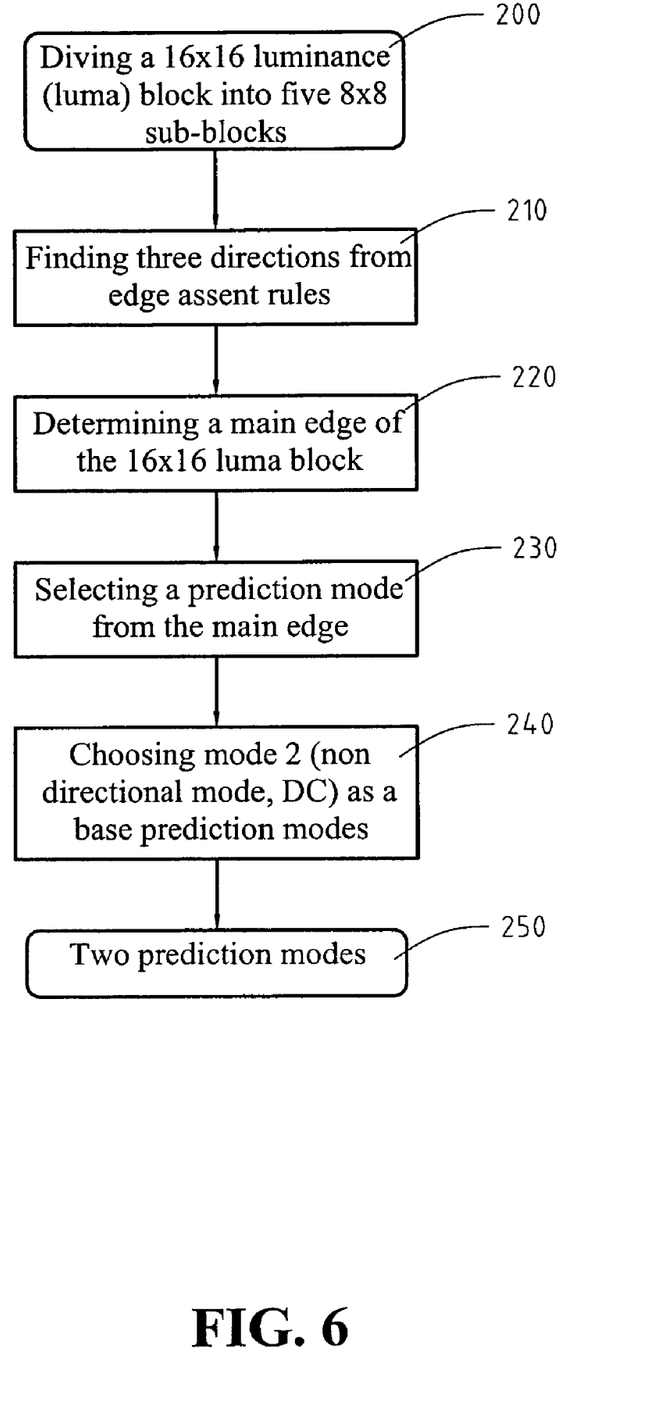
FIG. 6 is a flow diagram of a 16×16 luminance block intra prediction direction detection algorithm in accordance with the present invention.

With reference to FIG. 6, the 16×16 luminance (luma) block intra prediction direction detection algorithm comprises acts of dividing a 16×16 luma block into five 8×8 sub-blocks (200), finding three directions from edge assent rules (210), determining a main edge of the 16×16 luma block (220), selecting a prediction mode from the main edge (230), choosing mode 2 as a base protection mode (240) and using the two prediction modes for 16×16 luma block intra prediction (250).

The act of dividing the 16×16 luma block into five 8×8 sub-blocks (200) comprises dividing the 16×16 luma block into five 8×8 sub-blocks and computing average pixel values ($P_k$) for each 8×8 sub-block. The average pixel values ($P_k$) can be attained by $$p_k = \left\{\sum_{i=0}^{7}\sum_{j=0}^{7} f(x_k + i, y_k + j)\right\} / 64$$

wherein k=0, 1, 2, 3, and 4, and ($x_k$, $y_k$) denotes the starting position of the $k^{th}$ 8×8 luma sub-block.

For example, the 16×16 luma block has luma pixels data as follows:

```
84 84 84 84 84 84 84 84 84 84 84 84 84 84 84 84
84 84 84 84 84 84 84 84 84 84 84 84 84 84 84 84
83 83 83 83 83 83 83 83 83 83 83 83 83 83 84 84
83 83 83 83 83 83 83 83 83 83 83 83 83 84 84 84
81 81 81 82 82 82 82 82 81 81 81 81 82 83 84 84
81 81 81 82 82 82 82 81 81 80 80 81 81 82 82 82
80 80 80 81 81 81 81 81 80 80 79 79 79 79 80 80
80 80 80 81 81 81 81 81 80 80 79 79 79 79 79 79
69 69 70 71 72 73 74 76 76 77 78 79 80 80 81 81
40 40 41 41 42 42 43 45 45 46 48 50 52 54 55 55
42 42 41 41 41 40 41 42 42 43 42 39 38 37 36 35
```

-continued

```
44 44 43 42 42 41 41 41 41 42 42 42 42 41 41 41
44 44 43 42 42 41 41 42 42 42 42 42 42 42 42 42
44 44 43 42 42 42 42 42 42 42 42 42 42 42 42 42
44 44 43 42 43 42 42 42 42 42 42 42 42 42 42 42
44 44 43 42 43 42 42 42 42 42 42 42 42 42 42 42
```

The act of finding three directions from edge assent rules (210) comprises determining an edge assent to the 16×16 luma block, where the following edge assent rules have been developed:

$$d^{0°} = |P_1-P_0|+|P_3-P_2|$$

$$d^{90°} = |P_2-P_0|+|P_3-P_1|$$

$$d^{45°} = |P_4-P_1|+|P_2-P_4|$$

The act of determining a main edge of the 16×16 luma block (220) is based on a smaller direction error strength indicating a more preferable direction. Therefore, the main edge of the 16×16 luma block is determined by the smallest direction error strength.

The act of selecting a prediction mode from the main edge (230) comprises selecting a prediction mode from four known prediction modes closest to the direction of the main edge determined in the previous act where the four known prediction modes for a 16×16 luma block are Mode 0: (FIG. 1(*a*)) a vertical mode;
Mode 1: (FIG. 1(*b*)) a horizontal mode;
Mode 2: (FIG. 1(*c*)) a DC mode; and
Mode 3: a Plane mode (not shown).

Since the 16×16 luma intra prediction only uses four known prediction modes and mode 2 (DC) has no associated direction, the next act comprises only choosing mode 2 (DC) as a base prediction mode (240).

Therefore, only two modes (prediction mode chosen based on the main edge and mode 2) are used.

Figure 7:
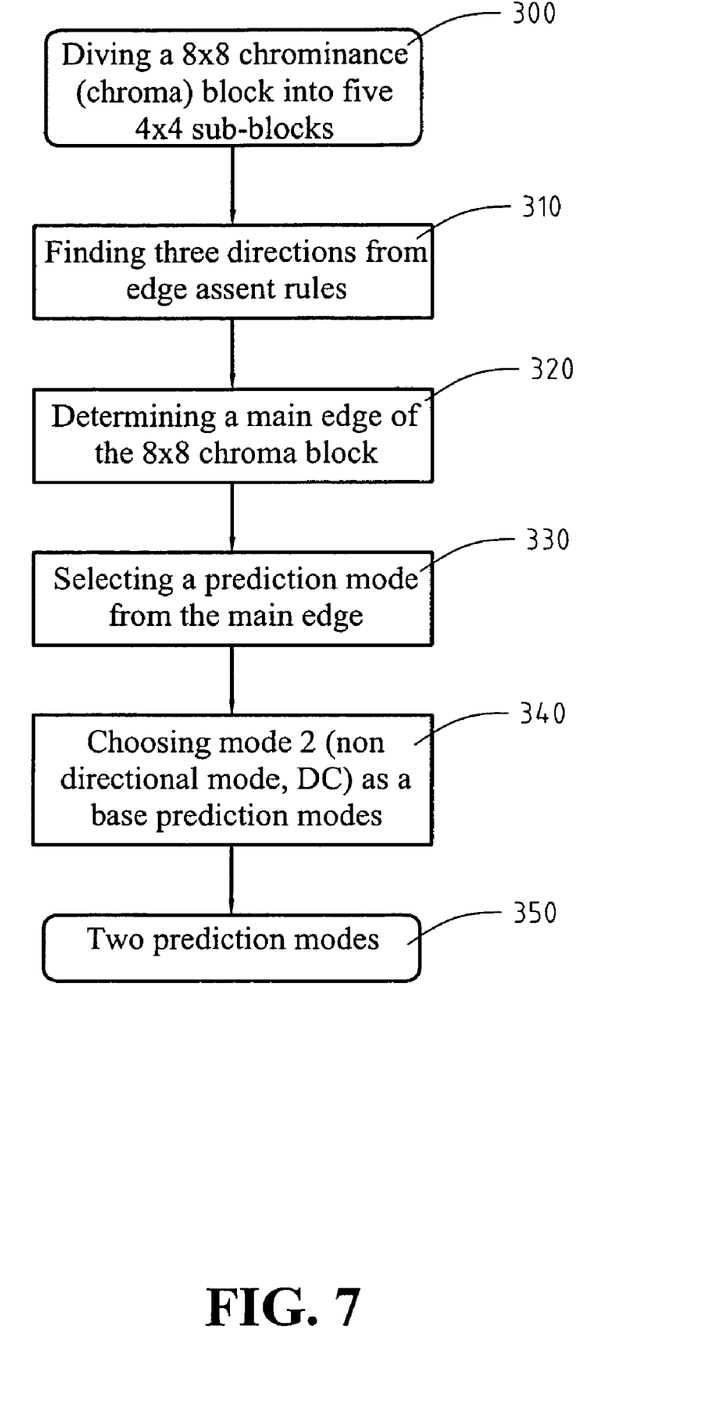
FIG. 7 is a flow diagram of an 8×8 chrominance block intra prediction direction detection algorithm in accordance with the present invention.

With reference to FIG. 7, the 8×8 chroma block intra prediction direction detection algorithm comprises acts of dividing an 8×8 chroma block into five 4×4 sub-blocks (300), finding three directions from edge assent rules (310), determining a main edge of the 8×8 chroma block (320), selecting a prediction mode from the main edge (330), choosing mode 2 as a base prediction mode (340) and using the two prediction modes for 8×8 chroma block intra prediction (350).

The act of dividing the 8×8 chroma block into five 4×4 sub-blocks (300) further comprises dividing the 8×8 chroma block into five 4×4 sub-blocks ($P_0$, $P_1$, $P_2$, $P_3$ and $P_4$) and computing average pixel values ($P_k$) for each 4×4 sub-block. The average pixel values ($P_k$) can be attained by $$p_k = \left\{\sum_{i=0}^{3}\sum_{j=0}^{3} f(x_k + i, y_k + j)\right\} / 16$$

wherein k=0, 1, 2, 3, and 4, and ($x_k$, $y_k$) denotes the starting position of the $k^{th}$ 4×4 chroma sub-block.

For example, the 8×8 chroma block has luma pixels data as follows:

```
84 84 84 84 84 84 84 84
84 84 84 84 84 84 84 84
83 83 83 83 83 83 83 83
83 83 83 83 83 83 83 83
```

| | | | | | | | |
|---|---|---|---|---|---|---|---|
| 81 | 81 | 81 | 82 | 82 | 82 | 82 | 82 |
| 81 | 81 | 81 | 82 | 82 | 82 | 82 | 82 |
| 80 | 80 | 80 | 81 | 81 | 81 | 81 | 81 |
| 80 | 80 | 80 | 81 | 81 | 81 | 81 | 81 |

The act of finding three directions from edge assent rules (310) comprises determining an edge assent to the 16×16 luma block, where the following edge assent have been developed:

$$d^{0°}=|P_1-P_0|+|P_3-P_2|$$

$$d^{90°}=|P_2-P_0|+|P_3-P_1|$$

$$d^{45°}=|P_4-P_1|+|P_2-P_4|$$

The act of determining a main edge of the 8×8 chroma block (320) is based on a smaller direction error strength indicating a more preferable direction. Therefore, the main edge of the 8×8 chroma block is determined by the smallest direction error strength.

The act of selecting a prediction mode from the main edge (330) comprises selecting a prediction mode from four known prediction modes closest to the direction of the main edge determined in the previous act where the four known prediction modes for a 8×8 chroma block are Mode 0: (FIG. 1(*a*)) a DC mode;
Mode 1: (FIG. 1(*b*)) a horizontal mode;
Mode 2: (FIG. 1(*c*)) a vertical mode; and
Mode 3: a Plane mode (not shown).

Since the 8×8 chroma intra prediction only uses four known prediction modes and mode 2 (DC) has no associated direction, the next act comprises only choosing mode 2 (DC) as a base prediction mode (340).

Therefore, only two modes (the prediction mode chosen based on the main edge and mode 2) (350) are used.

Consequently, the present invention decreases the prediction modes used in intra prediction.

Those skilled in the art will understand that various changes, modifications, and alterations in form and details may be made without departing from the spirit and scope of the invention, as claimed in the following claims.

What is claimed is:

1. A direction detection algorithm for H.264/AVC intra prediction comprising the acts of:
   dividing a 4×4 block into four evenly-divided 2×2 sub-blocks and an inner 2×2 sub-block;
   computing average pixel values for the four evenly-divided 2×2 sub-blocks and an average pixel value for the inner 2×2 sub-block;
   finding four directions from edge assent rules, the pixel values and all of said sub-blocks;
   determining a main edge of the 4×4 block based on the four directions;
   selecting three prediction modes from the main edge and its adjacent directions;
   choosing mode 0 (90°), mode 1 (0°) and mode 2 (non directional mode, DC) as base prediction modes;
   determining unique ones of the selected prediction modes by determining if any of the selected prediction modes is the same as one of the base prediction modes; and
   using the unique ones of the selected prediction modes and the base prediction modes in intra prediction of the 4×4 block.

2. The direction detection algorithm for H.264/AVC intra prediction as claimed in claim 1, wherein five of the unique selected prediction modes and the base prediction modes exist and are used in the 4×4 intra prediction.

3. The direction detection algorithm for H.264/AVC intra prediction as claimed in claim 1, wherein all of the selected prediction modes are unique, and all six of the unique selected prediction modes and the base prediction modes are used in the 4×4 intra prediction.

4. The direction detection algorithm for H.264/AVC intra prediction as claimed in claim 1, wherein the act of finding four directions from edge assent rules comprises determining an edge assent to the 4×4 block.

5. The direction detection algorithm for H.264/AVC intra prediction as claimed in claim 1, wherein the act of determining if any of the selected prediction modes is the same as one of the base prediction modes is performed by comparing each of the selected prediction modes to the base prediction modes.

6. The direction detection algorithm for H.264/AVC intra prediction as claimed in claim 1, wherein the average pixel values are attained by
$P_k=\{f(x_k, y_k)+f(x_k+1, y_k), f(x_k, y_k+1), f(x_k+1, y_k+1)\}/4$
where k=0, 1, 2, 3, and 4, and $(x_k, y_k)$ denotes a starting position of a $k^{th}$ one of the 2×2 sub-blocks.

7. The direction detection algorithm for H.264/AVC intra prediction as claimed in claim 4, wherein the edge assent rules are:

$$d^{0°}=|P_1-P_0|+|P_3-P_2|;$$

$$d^{90°}=|P_2-P_0|+|P_3-P_1|;$$

$$d^{45°}=|P_4-P_1|+|P_2-P_4|; \text{ and}$$

$$d^{135°}=|P_4-P_0|+|P_3-P_4|.$$

8. A direction detection algorithm for H.264/AVC intra prediction comprising the acts of:
   dividing a 16×16 luma block into five 8×8 sub-blocks;
   finding three directions from edge assent rules and the sub-blocks;
   determining a main edge of the 16×16 luma block based upon the directions;
   selecting a prediction mode from the main edge;
   choosing mode 2 as a base prediction mode; and
   using the selected prediction mode and the base prediction mode for intra prediction of the 16×16 luma block.

9. The direction detection algorithm for H.264/AVC intra prediction as claimed in claim 8, further comprising computing average pixel values for each 8×8 sub-block and the act of finding three directions from edge assent rules is further based upon the average pixel values.

10. The direction detection algorithm for H.264/AVC intra prediction as claimed in claim 8, wherein the act of finding three directions from edge assent rules comprises determining an edge assent to the 16×16 luma block from the following edge assent rules:

$$d^{0°}=|P_1-P_0|+|P_3-P_2|;$$

$$d^{90°}=|P_2-P_0|+|P_3-P_1|; \text{ and}$$

$$d^{45°}=|P_4-P_1|+|P_2-P_4|.$$

11. The direction detection algorithm for H.264/AVC intra prediction as claimed in claim 8, wherein the act of selecting a prediction mode from the main edge comprises selecting a prediction mode from four known prediction modes closest to a direction of the determined main edge, the four known prediction modes being:
   Mode 0: a vertical mode;
   Mode 1: a horizontal mode;

Mode 2: a DC mode; and
Mode 3: a Plane mode.

12. The direction detection algorithm for H.264/AVC intra prediction as claimed in claim 9, wherein the average pixel values ($P_k$) are attained by $$p_k = \left\{\sum_{i=0}^{7}\sum_{j=0}^{7} f(x_k+i, y_k+j)\right\}\bigg/64$$

wherein k=0, 1, 2, 3, and 4, and ($x_k$, $y_k$) is a starting position of a $k^{th}$ one of the 8×8 luma sub-blocks.

13. A direction detection algorithm for H.264/AVC intra prediction comprising the acts of:
dividing an 8×8 chroma block into five 4×4 sub-blocks;
finding three directions from edge assent rules and the sub-blocks;
determining a main edge from the directions;
selecting a prediction mode from the main edge;
choosing mode 2 as a base prediction mode; and
using the selected prediction mode and the base prediction mode for intra prediction of the 8×8 chroma block.

14. The direction detection algorithm for H.264/AVC intra prediction as claimed in claim 13 further comprising computing average pixel values for each 4×4 sub-block and finding the three directions is further based upon the average pixel values.

15. The direction detection algorithm for H.264/AVC intra prediction as claimed in claim 13, wherein the average pixel values ($P_k$) are attained by $$p_k = \left\{\sum_{i=0}^{3}\sum_{j=0}^{3} f(x_k+i, y_k+j)\right\}\bigg/16$$

wherein k=0, 1, 2, 3, and 4, and ($x_k$, $y_k$) denotes a starting position of a $k^{th}$ one of the 4×4 chroma sub-block.

16. The direction detection algorithm for H.264/AVC intra prediction as claimed in claim 13, wherein the edge assent rules are:

$$d^{0°}=|P_1-P_0|+|P_3-P_2|;$$

$$d^{90°}=|P_2-P_0|+|P_3-P_1|; \text{ and}$$

$$d^{45°}=|P_4-P_1|+|P_2-P_4|.$$

17. The direction detection algorithm for H.264/AVC intra prediction as claimed in claim 13, wherein the act of selecting a prediction mode from the main edge comprises selecting a prediction mode from four known prediction modes closest to a direction of the determined main edge, the four known prediction modes being:
Mode 0: a DC mode;
Mode 1: a horizontal mode;
Mode 2: a vertical mode; and
Mode 3: a Plane mode.

* * * * *